United States Patent [19]

Warkentin

[11] Patent Number: 4,730,967
[45] Date of Patent: Mar. 15, 1988

[54] ADJUSTABLE ANTI-ROTATION DEVICE FOR A FASTENER RECEPTACLE

[75] Inventor: Roy L. Warkentin, Lomita, Calif.

[73] Assignee: Rexnord Inc., Brookfield, Wis.

[21] Appl. No.: 882,021

[22] Filed: Jul. 3, 1986

Related U.S. Application Data

[63] Continuation of Ser. No. 652,798, Sep. 21, 1984, abandoned.

[51] Int. Cl.$^4$ .............................................. F16B 37/04
[52] U.S. Cl. .................................. 411/103; 411/127; 411/174
[58] Field of Search ............... 411/103, 520, 522, 523, 411/539, 174, 175, 107, 87, 88, 89, 90, 123, 124, 125, 126, 127

[56] References Cited

U.S. PATENT DOCUMENTS

| | | | |
|---|---|---|---|
| 377,714 | 2/1888 | Haws | 411/123 |
| 850,432 | 4/1907 | Kennedy | 411/87 |
| 866,279 | 9/1907 | Jenkins | 411/90 |
| 930,806 | 8/1909 | Smith | 411/123 |
| 1,327,435 | 1/1920 | Kurtz | 411/123 |
| 2,244,427 | 6/1941 | Miller | 411/522 X |
| 2,278,708 | 4/1942 | Miller | 411/522 X |
| 2,390,752 | 12/1945 | Tinnerman | . |
| 2,748,906 | 6/1956 | Flora | 411/107 X |
| 2,933,970 | 4/1960 | Pagano | 411/520 |
| 3,020,947 | 2/1962 | McKelvey | . |
| 3,695,324 | 10/1972 | Gulistan | 411/111 |
| 4,440,535 | 4/1984 | Oehlke | 411/174 X |

FOREIGN PATENT DOCUMENTS

| | | |
|---|---|---|
| A-1500930 | 8/1969 | Fed. Rep. of Germany . |
| B-1475045 | 10/1969 | Fed. Rep. of Germany . |
| B-2059006 | 11/1973 | Fed. Rep. of Germany . |
| A1-2328676 | 1/1975 | Fed. Rep. of Germany . |
| A1-2408837 | 9/1975 | Fed. Rep. of Germany . |
| 6107 | of 1903 | United Kingdom ............ 411/123 |
| A-1361404 | 7/1970 | United Kingdom . |

OTHER PUBLICATIONS

Procedures for Installing Captive Nuts with Handtools—Deutsch Fastener Corporation.
Self-Sealing Rivetless Floating Nut Plate #SFN6010—Deutsch Fastener Corporation.
Rivetless Floating Nut Assembly-#FF6010—Deutsch Fastener Corporation.
Kaylock Anchor Nut Clip-On 450° F. #K19798—Kaynar, A Microdot Company.

Primary Examiner—Gary L. Smith
Assistant Examiner—Rodney M. Lindsey

[57] ABSTRACT

A device 10 for a receptacle secured to a substructure is provided. The torque arm has a first portion 11 and a second portion 18, formed integral and substantially normal to the second portion, so as to provide a load transferring mechanism which prevents rotation of the receptacle as a torque load is applied. The torque arm 10, secured adjacent the substructure is constructed so as to allow use within a range of adjustment as determined by the distance from the substructure end edge 27 to the center of the opening in the substructure 24.

4 Claims, 8 Drawing Figures

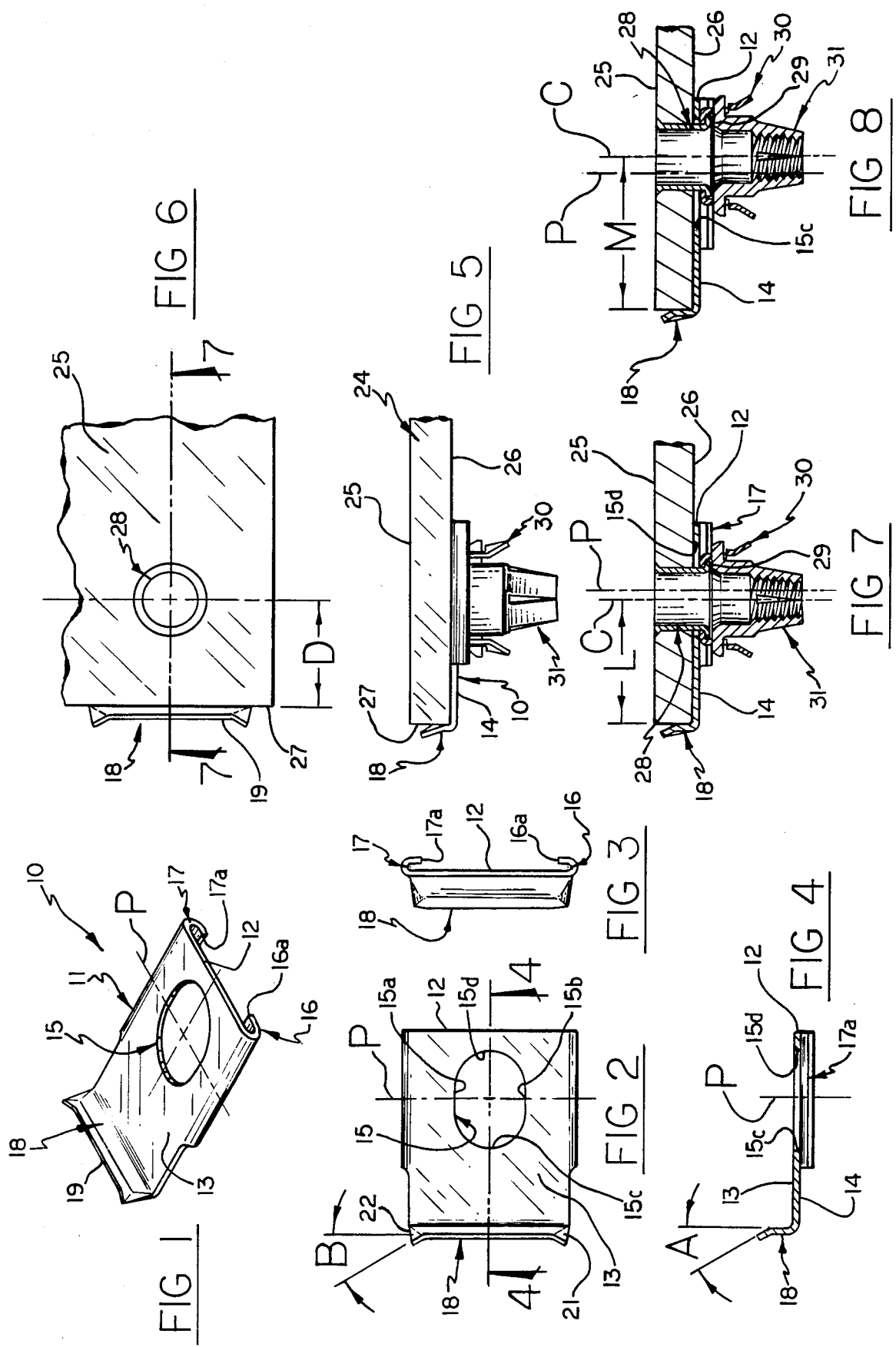

ADJUSTABLE ANTI-ROTATION DEVICE FOR A FASTENER RECEPTACLE

This application is a continuation of application Ser. No. 652,798, filed Sept. 21, 1984 now abandoned.

TECHNICAL FIELD

The present invention relates to devices for attaching the receptacle of a fastener to a substructure, and in particular to devices which prevent rotation of a receptacle with respect to the substructure to which it is secured.

BACKGROUND

Devices which are used to secure a fastener receptacle, e.g., a nut, to a substructure are well known in the fastener technology. For example, a grommet installed in an opening in the substructure can serve to secure a fastener receptacle to the substructure. The needs of the fastener industry in this regard have changed as new materials are used and increased strength requirements are specified. Thus the prior art devices, while serving the past needs of the industry, are often incapable of fulfilling the new requirements. For example, installation of the prior art devices often require that additional holes be made in the material to secure the device in place, e.g., rivet holes. Such holes, however, reduce the strength of the substructure and such is not a desirable result. In answer to that problem rivetless attachments for fastener receptacles were created. Such new designs answered one need, however, they then proved unsuitable for use in certain types of materials, e.g., composite materials. Another problem which required a solution was the need to prevent the receptacle from rotating relative to the substructure as the mating portion of the fastener was secured therein. Because of the unique characteristics of materials such as composites, as well as, the need for an adjustable feature along with space and size restrictions, it was found that the prior art was unable to provide a solution. Hence the development of the present invention.

SUMMARY OF THE INVENTION

The present invention is an adjustable torque arm for use with a fastener receptacle to prevent rotation of the receptacle relative to the substructure. The torque arm has a first portion which underlies one side of the substructure. A cage for the receptacle is held by this portion of the torque arm. A second portion of the torque arm is formed integral with the first portion and extends therefrom at a substantially right angle. The second portion is constructed so as to be positioned against an end edge of the substructure when installed. Together the two portions of the torque arm prevent the receptacle from rotating as the mating portion of the fastener is secured thereto.

Another feature of the invention is the construction and design of the torque arm such that it may be adjusted for use in a variety of substructure designs even though the distance from the substructure end edge to the center of the substructure opening varies within a pre-determined range. This is accomplished by providing an elongated opening in the torque arm first portion.

Still another feature of the invention prevents fretting of the materials in the assembly which would otherwise result from the contact of sharp edges of the the torque arm with the substructure.

These and other features of the invention will be discussed further in the detailed description which follows.

BRIEF DESCRIPTION OF THE DRAWINGS

FIG. 1 is a view in perspective of the preferred embodiment of the present invention.

FIG. 2 is a top plan view of the preferred embodiment of the present invention.

FIG. 3 is a side elevational view of the preferred embodiment of the present invention.

FIG. 4 is a view in cross-section of the present invention as seen generally along lines 4—4 in FIG. 2.

FIG. 5 is a side elevational view of the preferred embodiment of the present invention as shown installed in one application with a fastener receptacle to a substructure.

FIG. 6 is a top plan view of what is shown in FIG. 5.

FIG. 7 is a view in cross-section of the assembly as seen generally along lines 7—7 in FIG. 6 showing the invention as positioned at the minimum end of its range of adjustment.

FIG. 8 is a view similar to that of FIG. 7 showing the invention as positioned at the maximum end of its range of adjustment.

DETAILED DESCRIPTION OF A PREFERRED EMBODIMENT OF THE PRESENT INVENTION

In the several views like reference numerals are used throughout to represent identical or like elements of the invention. With reference now to FIGS. 1 through 4 the construction of a preferred embodiment of the present invention will be described. The torque arm 10 of the preferred embodiment is constructed as a one-piece element. A first portion 11 is generally rectangular in shape and has a free end 12, a first or top surface 13, a second or bottom surface 14, an elongated opening 15 and an opposing pair of channel members 16, 17. Each channel member 16, 17, extends in an arcuate configuration from the top surface 13 to a free end 16a, 17a respectively located a predetermined distance below the bottom surface 14 of the first portion. A second portion 18 is formed integral with an end of the first portion 11 opposite the free end 12. The second portion 18 is of a pre-determined height and extends upwardly from the top surface 13 of the first portion 11 and terminates in a free end edge 19. The second portion 18 is formed by a series of bending actions. A first bend area defines the juncture between the first portion 11 and the second portion 18. A second bend area is located a pre-determined distance upward along the second portion 18 from the first bend area. This bend area defines an upper end of the second portion 18 which is directed so as to extend out and away from the remaining portions of the torque arm 10. The angle A, defined as the angle included between a vertical plane containing the unbent area of the second portion 18 and a plane tangent to the arc of the second bend area, represents the angle of bend for the construction of the preferred embodiment. Third and fourth bend areas are those at either end of the side edges 21, 22 which result in the second portion being formed into an arcuate-shaped configuration as viewed from the top and as can be seen in FIG. 2. The angle B, is the included angle between the intersection of a plane containing the unbent area of the second portion 18 and a plane tangent to the third or fourth bend areas respectively.

The advantages and features of the present invention may be appreciated from a discussion of the use of the preferred embodiment in an application illustrated in FIGS. 5–8. In FIG. 5 the preferred embodiment as combined with a known fastener receptacle widely used in the panel fastener industry is illustrated. The torque arm 10 is installed so as to be positioned intermediate the substructure and the fastener receptacle. The substructure 24 may be either metal, a composite, plastic, etc. The substructure has a top surface 25, a bottom surface 26 opposite thereto, an end edge 27 and an opening or hole formed in the substructure whose center is a pre-determined distance D from the end edge 27. Within this opening a grommet 28 is inserted. The torque arm 10, assembled with a cage 30 supported in the channel members 16, 17, is placed along the bottom surface of the substructure with one end 29 of the grommet 28 extending beyond the torque arm surface 14 and the cage 30. In this assembly the cage 30 is fastened to the grommet 28. The receptacle 31 is then installed in the cage 30, forming as a result the arrangment shown in FIG. 7. In this illustration the receptacle is a flat beam nut.

The unique adjustment feature of the present invention will be appreciated from a study of FIGS. 2, 7 and 8 which illustrate the positioning of the receptacle relative to the torque arm 10 at the two extremes of the range for adjustment. The opening 15 in the torque arm first portion 11 is elongated and has two opposing straight sides 15a, 15b, which are continuous with opposing arcuate sides 15c, 15d. The distance between the arcuate sides 15c, 15d is pre-determined as is the distance between the opposing straight sides 15a, 15b. This opening must be sufficiently large to allow the grommet end 29 to pass therethrough as the flared grommet end 29 will seat firmly on the cage 30 when the arrangement is installed. The distance between the arcuate sides 15c, 15d is greater than the diameter of the grommet 28 to allow linear movement of the torque arm 10. The exact dimension of this distance is selected in accordance with the amount of adjustment capability desired. This adjustment capability is defined by the range of distances from the end edge 27 of the substructure to the center of the substructure opening or the center of the grommet secured therein. Thus in FIG. 7 a substructure 24 having a minimum distance L between the substructure end edge 27 and the substructure opening center is shown. It can be seen that the grommet abuts against torque arm arcuate side 15c when the minimum distance application is involved. In FIG. 8 the installation is shown as it would appear in a substructure having a maximum length M between the end edge 27 and the center of the substructure opening. In FIGS. 2, 7 and 8 the plane P represents a plane equidistant from arcuate side 15c and arcuate side 15d of the torque arm opening 15. Plane C represents a plane which passes through the center of the substructure opening as well as the center of the grommet 28. Thus it can be appreciated that one torque arm can satisfy a number of substructure designs so long as the distance from the substructure end edge 27 to the center of the substructure opening is within the range of adjustment, i.e., less than or equal to M but greater than or equal to L, for that particular torque arm.

The advantages provided by the present invention which are not provided by any single device of the prior art can now be appreciated. First, the present invention is not restricted to use in any particular material. It may be installed and used with a substructure made from a carbon composite material as satisfactorily as one made from a metallic material. In either case no additional holes are required other than the single opening required for a grommet or like component. As a result the strength of the material is not reduced by an installation employing the present invention.

Secondly, as mentioned above, regardless of the distance between the end edge 27 of the substructure and the center of the opening therein, one torque arm may suit the need so long as that distance is within the adjustment range for that particular torque arm size. Thus the need for an extensive inventory of non-adjustable torque arm sizes or the necessity of designing the substructure so that the opening is a specific distance from the substructure end edge as dictated by the torque arm configuration, is eliminated. Thus the user is provided a degree of flexibility unknown with prior art devices.

Thirdly, the first and second portions of the torque arm mate with and generally lie against respective adjacent portions of the substructure end edge 27 and the bottom surface 26 of the substructure. As a result, this wrapped-around configuration provides a torque-arm effect which prevents rotation of the receptacle when a mating portion of the fastener is being placed therein. An applied torque load is transferred from the receptacle 31 to the cage 30, on to the first portion 11 then on to the torque arm second portion 18 which then bears against the substructure 24. Rotation of the receptacle is thus prevented as the load being applied continues to be transferred to the substructure.

A fourth feature of the present invention involves the bend areas of the torque arm second portion 18. As a result of the free end of the second portion 18 being formed so that all sharp areas of the second portion 18 are directed away from the adjacent substructure, fretting or undesirable wearing of the substructure 24 is minimized.

A fifth feature of the invention is that use of the torque arm allows a panel to be mounted flush with the substructure top surface 25. No portion of the invention extends above or along the top surface 25 to interfere with a flush mounting.

Thus it can be appreciated that the unique structure of the present invention provides a combination of features and advantages not found in the known prior art. It will be appreciated by persons skilled in the art that other embodiments of the invention are possible in light of the above description. Accordingly, it is believed the invention is limited only by the scope of the claims which follow.

What is claimed is:

1. A device in combination with a through-hole substructure, a fastener receptacle and a cage for the fastener receptacle, comprising:

said substructure having an edge in a portion thereof and a through-hole positioned within a predetermined range of distances from said edge;

said device having a first portion and a second portion connected to said first portion, said first portion having a free end and a surface, said surface being substantially flush with said substructure, said second portion being constructed so as to extend at an angle from said first portion and in relationship with said substructure edge so as to prevent rotation of said device relative to said substructure;

said fastener receptacle constructed and arranged for securement with said device by said cage, said receptacle including a portion with an opening therein provided for alignment with said substructure through-hole; and means for permitting self-centering of said receptacle opening with said substructure through-hole within said given range of distances of said substructure through-hole from said substructure edge;

said means including said device having a pair of channel members extending in a direction opposite said substructure, each of said channel members being a given length relative to said substructure through-hole range of distances, and further including said cage being constructed for sliding engagement within said channel members, whereby said receptacle captivated by said cage engaging said channel members is movable within said channel members along said predetermined range of distances, permitting said receptacle opening to be centered with said substructure through-hole.

2. The combination of claim 1 wherein said means, for permitting self-centering of said receptacle opening, further includes said device first portion having an opening therein, said opening being defined by a pair of opposing straight sides formed continuous with an opposing pair of arcuate sides, with the distance measured between said arcuate sides being greater than the distance between said straight sides, whereby said device in combination with said receptacle, said cage and said substructure through-hole permits self-centering of said receptacle opening with said substructure through-hole.

3. A device in combination with a through-hole in a substructure, a fastener receptacle and a cage for the fastener receptacle comprising:

said substructure having an edge in a portion thereof and a through-hole positioned within a predetermined range of distances from said edge;

said device having a first portion and a second portion connected to said first portion, said first portion having a free end and a surface, said surface being substantially flush with said substructure, said second portion being constructed so as to extend at an angle from said first portion and constructed in relationship with said substructure edge so as to prevent rotation of said device relative to said substructure;

said fastener receptacle constructed and arranged for securement with said device by said cage, said receptacle including a portion with an opening therein provided for alignment with said substructure through-hole; and means for permitting self-centering of said receptacle opening with said substructure through-hole within said given range of distances of said substructure through-hole from said substructure edge;

said means including said device having a pair of channel members extending in a direction opposite said substructure, each of said channel members being a given length relative to said substructure through-hole range of distances, and further including said cage being constructed for sliding engagement within said channel members, whereby said receptacle captivated by said cage engaging said channel members is movable within said channel members along said predetermined range of distances, permitting said receptacle opening to be centered with said substructure through-hole, said means further including said device first portion having an opening therein, said opening being greater in size than said substructure through-hole, whereby said device first portion opening in combination with said receptacle, said cage and said substructure through-hole permits self-centering of said receptacle opening with said substructure through-hole, with said device simultaneously being prevented from rotation with respect to said substructure.

4. A device in combination with a through-hole in a substructure, a fastener receptacle, and a cage for the fastener receptacle comprising:

a substructure having an edge in a portion thereof and a through-hole positioned within a predetermined range of distances from said edge;

said device having a first portion and a second portion connected to said first portion, said first portion having a free end and a surface, said surface being substantially flush with said substructure, said second portion being constructed so as to extend at an angle from said first portion and constructed in relationship with said substructure edge so as to prevent rotation of said device relative to said substructure;

said fastener receptacle constructed and arranged for securement with said device by said cage, said receptacle including a portion with an opening therein provided for alignment with said substructure through-hole; and means for permitting self-centering of said receptacle opening with said substructure through-hole within said given range of distances of said substructure through-hole from said substructure edge, said means including said device having a pair of channel members extending in a direction opposite said substructure, each of said channel members being a given length relative to said substructure through-hole range of distances, and further including said said cage being constructed for sliding engagement within said channel members, whereby said receptacle captivated by said cage engaging said channel members is movable within said channel members along said predetermined range of distances, permitting said receptacle opening to be centered with said substructure through-hole, said means further including said device first portion having an opening therein, said opening being defined by a pair of opposing straight sides formed continuous with an opposing pair of arcuate sides, with the distance measured between said arcuate sides being greater than the distance between said straight sides, whereby said device in combination with said receptacle, said cage and said substructure through-hole permits self-centering of said receptacle opening with said substructure through-hole, with said device simultaneously being prevented from rotation with respect to said substructure.

* * * * *